United States Patent
Schmitt et al.

[11] Patent Number: 6,125,130
[45] Date of Patent: Sep. 26, 2000

[54] METHOD OF REDUCING AMPLITUDE NOISE OF SOLID LASERS WITH RESONATOR-INTERNAL FREQUENCY DOUBLING, AND AN ARRANGEMENT FOR CARRYING OUT THIS METHOD

[76] Inventors: Nikolaus Schmitt, Hohenzollernstr. 152, 80797 München; Günter Toesko, Joseph-Heydn-Str. 1a, 96317 Kronach; Josef Schalk, Am Anger 2, 84051 Altheim; Susanne Nikolov, Hochackerstr. 5, 85521 Ottobrunn, all of Germany

[21] Appl. No.: 09/142,949
[22] PCT Filed: Mar. 19, 1997
[86] PCT No.: PCT/EP97/01364
 § 371 Date: Apr. 7, 1999
 § 102(e) Date: Apr. 7, 1999
[87] PCT Pub. No.: WO97/35369
 PCT Pub. Date: Sep. 25, 1997

[30] Foreign Application Priority Data
Mar. 19, 1996 [EP] European Pat. Off. ............. 196 10 717

[51] Int. Cl.[7] ....................................................... H01S 3/13
[52] U.S. Cl. ................... 372/31; 372/34; 372/22
[58] Field of Search ................................. 372/31, 34, 22, 372/26

[56] References Cited

U.S. PATENT DOCUMENTS

| | | | |
|---|---|---|---|
| 5,383,209 | 1/1995 | Hwang | 372/34 |
| 5,432,807 | 7/1995 | Okazaki et al. | 372/22 |
| 5,854,802 | 12/1998 | Jin et al. | 372/34 |

*Primary Examiner*—Leon Scott, Jr.
*Attorney, Agent, or Firm*—McGlew and Tuttle, P.C.

[57] ABSTRACT

The invention concerns a method of reducing the amplitude noise of solid lasers (e.g. Nd-YAG, Nd:YAlO, Nd:YLF, Nd:YVO$_3$, etc.) with resonator-internal frequency doubling (for example by KTP, LBO, BBO, KNbO3, LiNbO$_3$, etc.). According to the invention, some of the frequency-doubled ejected laser radiation or the fundamental wave radiation is guided onto a photodetector (in particular a photodiode) whose electrical output signal undergoes bandpass filtering which filters out a frequency range typical of the noise. This output signal, optionally after rectification, quadrature and/or integration, is then subjected to temperature regulation or control which corrects the temperature of the frequency-doubling crystal such that the output signal is minimized after the bandpass filter and thus the amplitude noise of the laser radiation is minimized.

18 Claims, 3 Drawing Sheets

METHOD OF REDUCING AMPLITUDE NOISE OF SOLID LASERS WITH RESONATOR-INTERNAL FREQUENCY DOUBLING, AND AN ARRANGEMENT FOR CARRYING OUT THIS METHOD

FIELD OF THE INVENTION

The present invention pertains to a process and device for minimizing the amplitude noise of solid lasers with frequency doubling within a cavity and more particularly to a process and device wherein a solid laser material and a frequency doubler crystal are located in a common cavity.

BACKGROUND OF THE INVENTION

Solid lasers (using mostly rare earth-doped crystals or glasses, e.g., Nd:YAG, Nd:YV0$_4$, Nd:YAlO, Nd:YLF, Nd:glass or other, similar solid materials) with frequency doubling within the cavity have been known for a long time and are used for many applications in laser technology. What is used here is the generation of the second or higher harmonic vibrations in materials (mostly crystals, which have no inversion center, e.g., KTP, LBO, BBO, KNbO$_3$, LiNbO$_3$ or other) with a high nonlinear coefficient, which generates light of double (or multiple) frequency of the irradiated light wave by anharmonic vibrations of the lattice atoms, excited by an incident light wave. The process of generating higher harmonics strongly depends on the power density (cf., e.g., Köchner, Solid-State Laser Engineering), so that to generate frequency-doubled laser radiation of high efficiency, the nonlinear crystal is often introduced (at least in the case of continuously working (cw) lasers) either into the cavity of the laser itself or into a separate cavity (see above or, e.g., Yariv, *Quantum Electronics*, 3rd ed., p. 402). Even though the latter case of a separate cavity for the frequency doubler offers the fundamental advantage of low amplitude variations, this arrangement is characterized by a considerable complication due to the fact that the cavity belonging to the frequency doubler crystal must be actively stabilized to the frequency of the laser cavity and the laser radiation should be possibly a single-frequency radiation to achieve a high efficiency. The first case of introducing the frequency doubler crystal into the laser cavity is substantially less complicated compared with this; it is possible to work in this case with lasers which emit in longitudinal modes ranging in number from a few to many; the cavity mirrors are usually selected to be highly reflective mirrors for the laser wavelength in order to achieve a maximum increase in power in the cavity and thus the highest possible efficiency of doubling; at the same time, the output mirror is highly transmittent for the frequency-doubled radiation in order to be able to properly decouple it from the cavity.

However, this arrangement has a loud amplitude noise, which is an inherent feature of the system and which was first described, to the best of our knowledge, by T. Baer in *J. Opt. Soc. Am.* B, Vol. 3, No. 9, September 1986, p. 1175. There are many different approaches to explain this noise. Baer explains this by a competition of different modes (since the actually most intense mode is doubled best, it is attenuated most by the decoupling from the laser cavity, and another longitudinal mode will now become the most intense one, etc.). Other explanations are based on the total frequency generation or on the competition between modes of different polarization (cf., e.g., EP 0 457 590 A2). However, all these mechanisms are probably involved in the noise process at the same time.

The fact that the laser may have a very low-frequency noise, which is manifested by a "flickering" of the laser beam, whose degree of modulation may reach up to 100%, is especially disturbing for many applications. This noise is highly chaotic because of the nonlinear relationship of the doubling efficiency (see Koechner, see above); stable states may become temporarily established, which may be abruptly followed by loud noise. This phenomenon has been investigated in the literature in detail (see, e.g., *Phys. Rev.* A, Vol. 41, No. 5, March 1990, p. 2778, or *Opt. Comm.*, Vol. 118 (1995), p. 289). Preliminary control models which are to eliminate this chaotic noise have also been designed, but the control bandwidth of these controllers is currently too narrow by several orders of magnitude (bandwidths markedly exceeding 1 MHz were necessary for a nonlinear control loop) in order to practically suppress the noise (see, e.g., *Phys. Rev.* A, Vol. 47, No. 4, April 1993, p. 3276).

Other approaches to minimizing the noise are based according to the state of the art on the introduction of a quarter-wave plate (see U.S. Pat. No. 4,618,957) or a Brewster plate (see DE 3 917 902 A1) into the cavity or on the temperature stabilization of the doubler crystal (see EP 0 329 442 A2). However, all these solutions according to the state of the art have substantial drawbacks.

Even though the introduction of an additional element into the cavity (quarter-wave plate or Brewster plate) makes it possible to extensively suppress the flickering of the laser, such elements in the cavity are to be adjusted very accurately, which increases the expense of manufacture, and these elements always lead to higher losses in the cavity (because of residual reflections and scattering) even in the case of the best adjustment, so that these higher losses also drastically reduce the power density and consequently the efficiency of doubling.

In contrast, the stabilization of the temperature of the doubler crystal (EP 0 329 442 A2) can be accomplished without such additional elements and it also makes it possible to markedly reduce the laser noise at equal power density. The reason for this might be that in the case of the angle-dependent phase matching (and such phase matching is involved here, cf. Koechner, p. 528), the doubler crystal itself acts as a quarter-wave plate of a very high order, which has the same effect as an additionally introduced quarter-wave plate, but without having to be additionally adjusted or without offering additional reflection or scattering surfaces. However, the exact adjustment of the length of the doubler crystal to an integer multiple of $\lambda/4$ takes place by an exact adjustment of the length of the doubler crystal via the temperature.

This process already comes very close to the process according to the present invention, but it still has an essential shortcoming. Since the laser cavity changes its temperature in the course of the operation, especially during changes in the environmental conditions or if a thermal equilibrium is reached only incompletely, there will be continuous changes in the length of the laser cavity and also in the exact temperature of the doubler crystal. Therefore, a pure stabilization of the crystal length to the temperature permits only operation in a very narrow temperature window under definitely constant environmental conditions and at the stable, steady thermal equilibrium (see EP 0 329 442 A2). However, these conditions are not usually satisfied in a laser operated under the real conditions of an application.

SUMMARY AND OBJECTS OF THE INVENTION

The primary object of the present invention is therefore to develop a process as well as an arrangement for carrying out the process, which makes it possible to actively adjust the optimal doubler laser temperature associated with the lowest laser noise (flickering) to changing environmental conditions or other disturbing effects and thus to make possible the practical use of the laser even outside defined environmental conditions and independently from the reaching of a thermal state of equilibrium.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
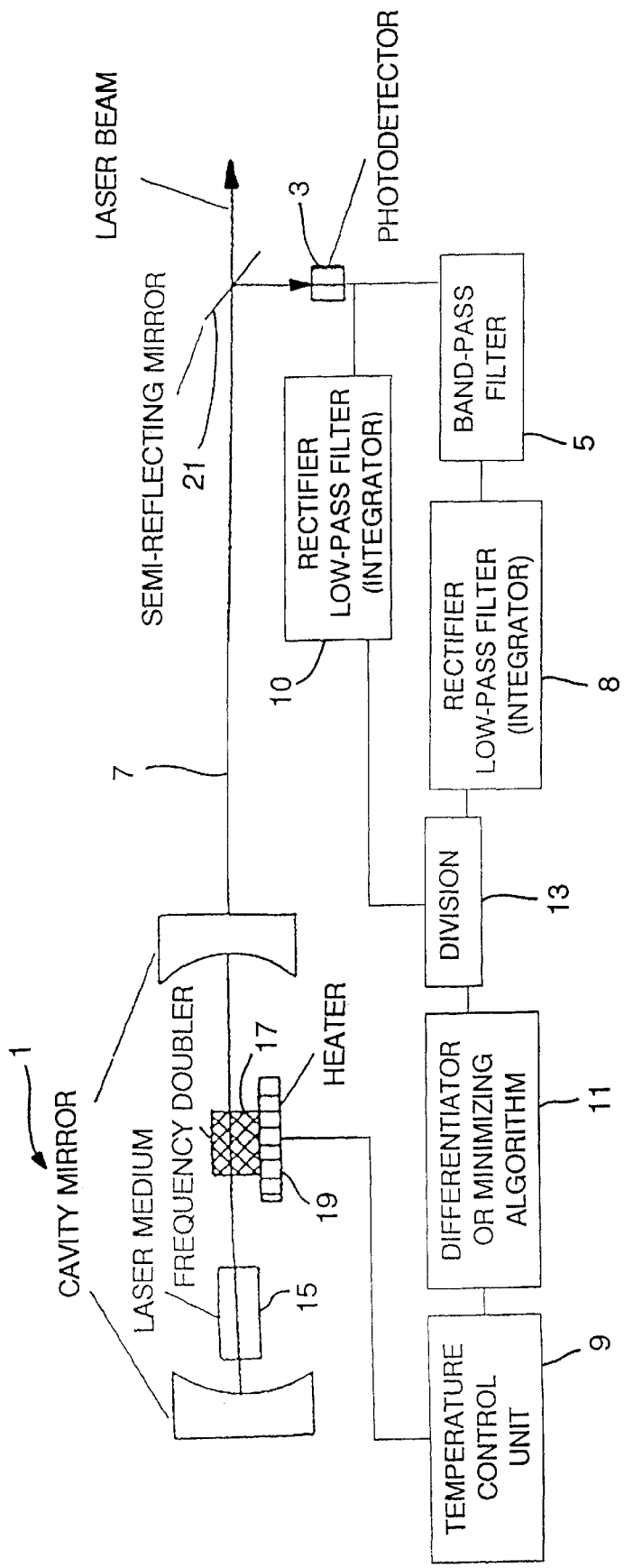
FIG. 1 is a block diagram of the control process according to the present invention, the elements drawn in broken lines being optional.

Referring to the drawings, the laser beam 7 is generated in a mirror cavity 1 with a laser medium 15 and a frequency doubler 17. A heater means 19 is connected to the frequency doubler 17 for altering the temperature of the frequency doubler 17. Once the laser beam leaves the mirror cavity 1, it passes through a semi-reflecting mirror 21 to siphon off some of the laser beam 7.

In comparison with EP 0 329 442 A2, the process according to the present invention is based on measuring the noise of the laser itself and it by adjusting the doubler crystal temperature.

Figure 2:
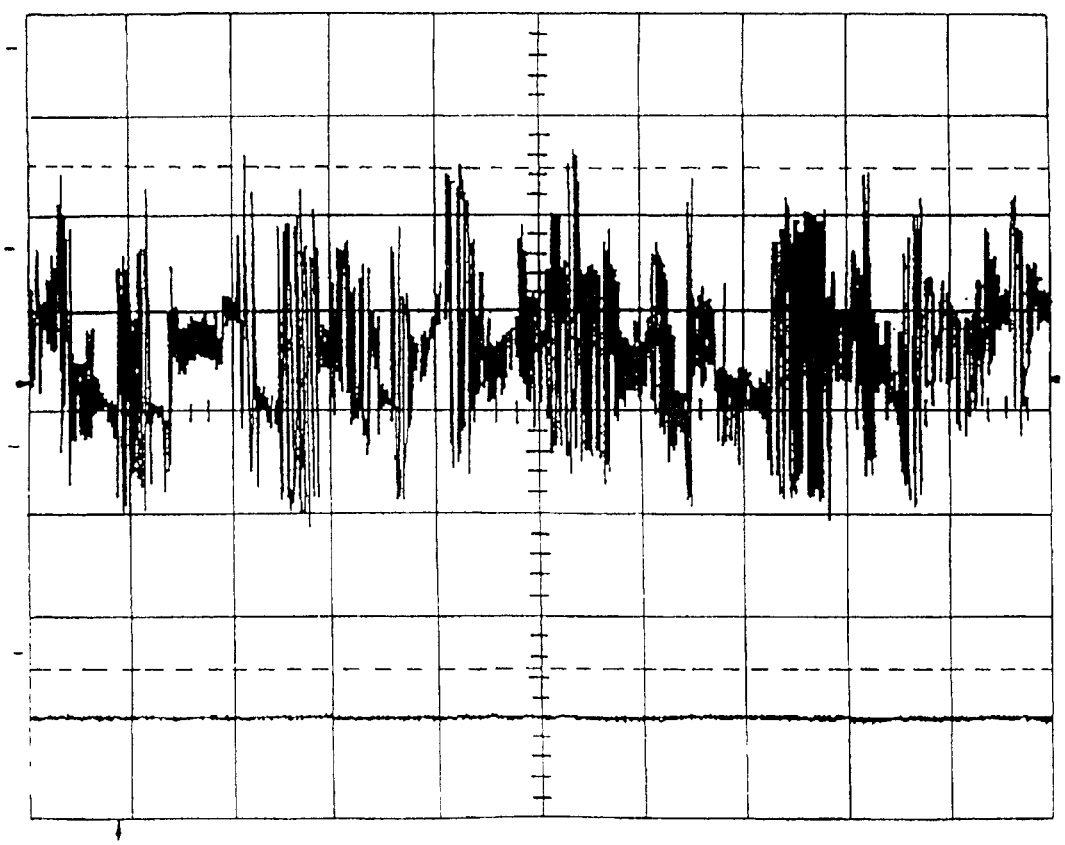
FIG. 2 is a graph of the typical noise of an in-cavity frequency-doubled laser with an abrupt drop in output (flickering) (time axis: 10 msec/unit)

However, the usually disturbing laser noise, the low-frequency "flickering," can be used as a control input signal only poorly, because the amplitude modulation has relatively long period durations (typically in the second range and longer), whereas the modulation process proper, i.e., the drop in output, takes place abruptly (FIG. 2). Consequently, there is no possibility of preventing such a rapid, but relatively rare drop in power by countercontrol by a rapid reaction of the temperature control with the prior-art slow time constants.

Figure 3:
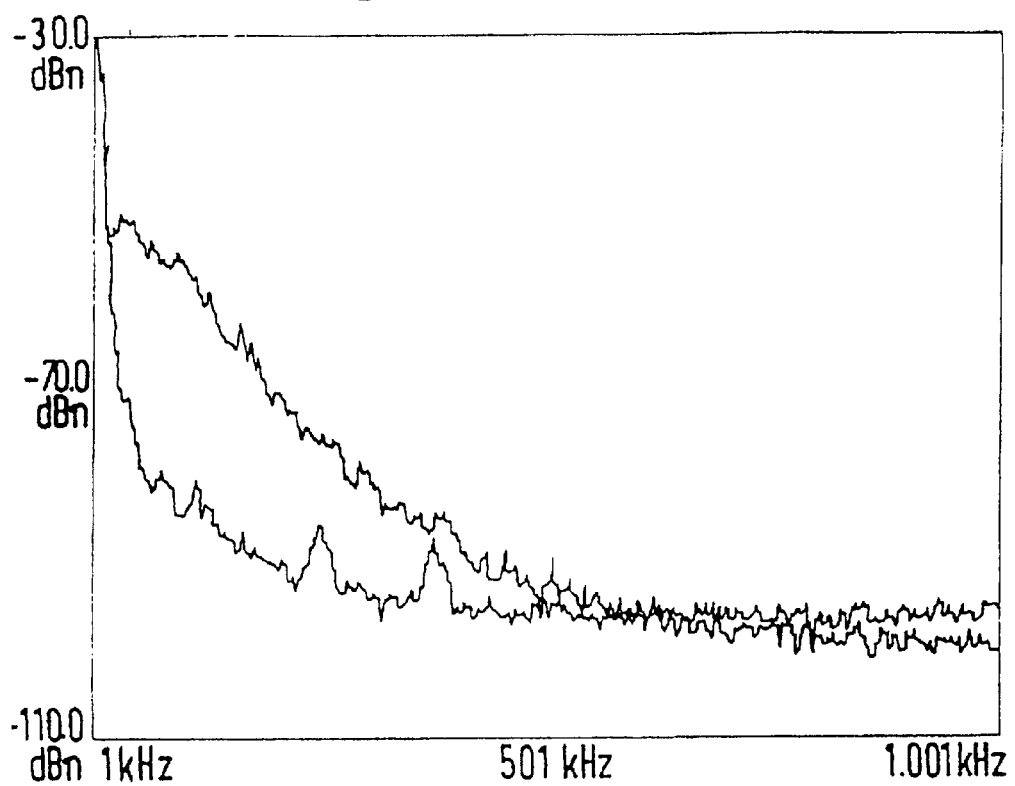
FIG. 3 is a graph of the noise measurement of an in-cavity frequency-doubled laser in the state of intense flickering (top curve) and in the stable state without flickering (bottom curve)

However, our measurements revealed that the stable states with the absence of flickering, in which the doubler temperature is consequently selected correctly, are correlated with an especially low higher-frequency laser noise. For example, FIG. 3 shows a typical measured curve of the laser amplitude-noise frequency spectrum at a suitable doubler crystal temperature and absence of flickering (bottom curve) and at poorly adjusted temperature with laser flickering occurring (top curve). It is clearly seen that the two curves have a significantly different noise amplitude, especially in the frequency range between 10 and 500 kHz, whereas the noise below 10 kHz and above 700 kHz is similarly intense for both temperatures and states of the laser (with and without flickering). This noise component in the above-described, significant frequency range shall therefore be used as a control signal for adjusting the temperature of the doubler crystal temperature.

To do so, a small portion of the laser output radiation in the range of a few mW or lower is tuned out of the useful laser beam 7 proper (this may preferably be the frequency-doubled beam or, because it is correlated with this, also a part of the residual radiation of the fundamental wavelength, which leaks from the laser cavity 1) and is brought to a photodetector 3 (e.g., a semiconductor diode). The electric output signal is then sent to an electric band pass filter 5 (optionally after amplification), so that only the noise signal in the above-described, significant frequency range is then picked up at the output. The signal is subsequently rectified or squared in means 8. This signal can now be sent as a control signal to be minimized to a temperature control circuit 9, which will now actively adjust the doubler crystal temperature to a minimal noise signal. Since the laser output can be stated as a fluctuating value or indefinitely only in some laser arrays, a signal may be additionally derived already before the band pass filter, and this signal is integrated in another means 10 and is therefore proportional to the mean laser output, so that an indicator of the power-related, relative noise is obtained by forming the quotient or ratio of this signal in division means 13 with the optionally likewise rectified and integrated noise signal proper from the means 8 behind the band pass filter. Depending on the quotient formation, this signal may be minimized or maximized in max/min means 11, e.g., by derivation and by sending it to a temperature control unit 9. According to another preferred embodiment, the noise signal is digitized either before or after the integration or squaring and is sent to a microprocessor unit (e.g., of the type of 68 HC 11 or similar types), which already has suitable analog inputs and outputs; as an alternative, it is also possible to use processors with external analog-digital and digital-analog converters; a digitally coded pulse width control signal may also be sent instead of a digital-analog conversion at the output), which performs the integration or squaring digitally in the first case but which sets the doubler crystal temperature by means of a suitable algorithm in both cases such that a minimum of noise signal is received. The output signal is preferably sent directly to a temperature control unit to change the doubler crystal temperature, or it is added in a temperature regulating unit as a change signal to the temperature set point. The control signal may, of course, also intervene at another suitable point of a temperature control unit. In the above-described case of fluctuating laser output, a low pass-filtered laser output signal may be subjected analogously to the noise signal to a quotient formation, as was described above, and then sent to the microprocessor unit in this case as well, or it may be sent via another input channel directly to the microprocessor unit, which will perform the quotient formation described digitally in this case.

An especially simplified arrangement is obtained by sending the optionally amplified photodiode signal to a microprocessor, which performs both the band pass filtration and the necessary rectification and squaring steps and the integrations and the quotient formation. The microprocessor may also assume the temperature control of the doubler crystal.

The process proposed thus makes it possible to actively track fluctuation-free (flicker-free) states of the frequency-doubled laser radiation at a relatively small bandwidth and, unlike in the case of the chaotic controls, to obtain a purely linear control principle in order to thus maintain the optimal doubler temperature even under changing environmental or disturbing effects and outside the thermal equilibrium. It is also possible to compensate (to a certain degree) aging and maladjustment effects.

It may be advantageous to limit the range of control of the temperature controller (with measures known from the state of the art) such that a second minimum of the laser noise (a second optimal doubler temperature; the correct length of the crystal for its action as a quarter-wave plate being periodic with λ/4) will not cause an ambiguity in the control behavior. Furthermore, too great a change in the doubler temperature may also lead, besides to ambiguities in the noise minimum, to an excessive change in the laser output, which also calls for a limitation of the range of control. To prevent the control system from "hitting" the boundaries of this limitation, provisions may optionally be made here to ensure that a jumping back into another temperature range located at a sufficient distance from the limits of control will take place when the limits of the limitation are reached. This may be carried out with ease by a corresponding programming of the microprocessor, especially in the case of the digital design of the process described.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

Figure 4:
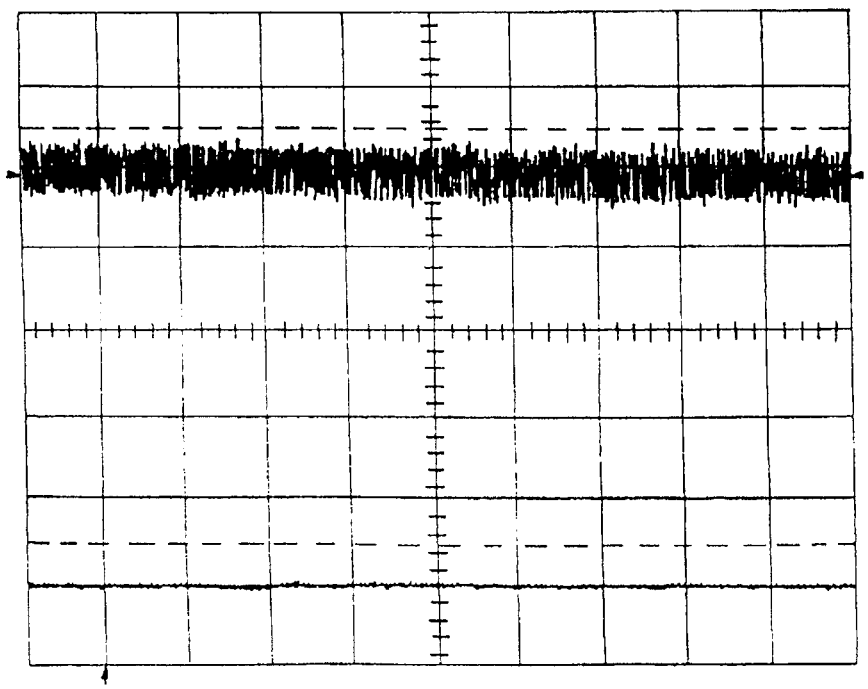
FIG. 4 is a graph of the noise measurement of a laser stabilized according to the present invention (time axis: 10 msec/unit).

FIG. 1
KEY:
Resonatorspiegel=Cavity mirror
Lasermedium=Laser medium
Frequenzverdoppler=Frequency doubler
Heizung=Heater
teilreflektierender Spiegel=Semi-reflecting mirror
Laserstrahl=Laser beam
Temperature-Regelung=Temperature control unit
Differenzierer oder Minimier-Algorithmus=Differentiator or minimizing algorithm
Division=Division
Gleichrichter=Rectifier
Tiefpaβ=Low-pass filter
(Integrator)=(Integrator)
Bandpaβ-Filter=Low-pass filter
Photodetektor=Photodetector
FIG. 2
FIG. 3
FIG. 4

What is claimed is:

1. A process for minimizing the amplitude noise of a solid state laser with a frequency doubler crystal, the process comprising the steps of:

removing a portion of radiation from the solid state laser;
converting said portion of radiation into a portion signal;
filtering said portion signal to remove frequencies outside of a predetermined frequency range and generate a filter signal, said predetermined frequency range including, frequencies having noise amplitudes which vary dependent on a temperature of the frequency doubler crystal;
measuring said noise amplitudes of said filter signal;
adjusting said temperature of the frequency doubler crystal to minimize said noise amplitudes.

2. A process in accordance with claim 1, wherein:

said converting includes sending said portion of radiation of the laser to a photodetector to create an electric output signal;
said filtering includes sending said electric output signal of said the photodetector to a band pass filter which filters out a frequency range typical of the noise to be minimized;
said measuring includes one of rectification, squaring and integration of said filter signal;
said adjusting of temperature is such that said filter signal from said band pass filter and consequently an amplitude noise of the laser radiation are minimized.

3. A process in accordance with claim 2, further comprising:

amplifying said portion signal from said photodetector signal and sending it to a microprocessor which performs said filtering and said rectification or squaring steps and integrations as well as quotient formations.

4. A process in accordance with claim 1, wherein:

a solid laser material and the frequency doubler crystal are located in a common cavity;
said portion of radiation is one of a part of frequency-doubled laser output radiation and fundamental wave radiation;
the solid laser is one of Nd:YAG, Nd:YAlO, Nd:YLF, Nd:YVO$_3$;
said frequency doubling crystal is one of KTP, LBO, BBO, KNbO$_3$, LiNbO$_3$.

5. A process in accordance with claim 1, wherein:

said predetermined frequency range has a lower limit between 10 to 100 kHz and an upper limit between 300 to 700 kHz.

6. A process in accordance with claim 1, wherein:

said predetermined frequency range is of a magnitude and location to have said filter signal include a frequency range of substantially 100 kHz to 300 kHz.

7. A process in accordance with claim 1, further comprising:

comparing said portion signal with said filter signal to form a ratio representing an indicator of power-related relative noise in predetermined frequency range of said filtering;
further adjusting said temperature of said frequency doubler crystal to one of maximize and minimize said ratio.

8. A process in accordance with claim 7, further comprising:

one of rectification, squaring, integration and low pass filtering of one of said filter signal before said comparing and said portion signal in parallel with said filtering but before said comparing.

9. A process in accordance with claim 1, wherein:

an output signal, which is optionally subjected to low pass filtration and is set in relation to the signal behind the bandpass filter, is also picked up before the band pass filter, so that this ratio represents an indicator of the power-related relative noise in the frequency range defined by the band pass filter;
a quotient represents a ratio of the noise signal behind the band pass filter to the output signal before the band pass filter;
said temperature of the frequency doubler crystal is set to minimized said quotient.

10. A process in accordance with claim 1, wherein:

said adjusting of said temperature is performed to prevent said adjusting from locking in on a local minimum of said noise amplitude.

11. A process in accordance with claim 1, wherein:

said portion signal and said filter signal are modified to only include a single noise amplitude minimum.

12. A process in accordance with claim 1, wherein:

said filter signal of is one of rectified, analogously squared, low pass filtered and integrated, said filter signal is then sent to an analog input of a microprocessor, said microprocessor determines a minimum of said noise amplitudes numerically by means of an algorithm as a function of said temperature and adjusts said temperature via a control output such that said minimum of said noise amplitudes will be maintained in said predetermined frequency range.

13. A process in accordance with claim 12, wherein:

a signal, which is proportional to the laser output, is additionally sent to the microprocessor at another analog input, and the microprocessor determines a minimum of a quotient of the filter signal and the output signal or the maximum of the reciprocal values thereof numerically by means of a suitable algorithm as a function of the temperature and adjusts the temperature via a control output such that this minimum of the relative noise will be maintained in said predetermined frequency range.

14. A process in accordance with claim 12, wherein:

said microprocessor also performs said adjusting of said temperature of the frequency doubler crystal.

15. A process in accordance with claim 1, wherein:

said filter signal is sent to an analog input of a microprocessor, which numerically rectifies or squares and optionally integrates this signal and determines the minimum of the noise numerically by means of a algorithm as a function of the temperature and adjusts the temperature via a control output such that this minimum of the noise will be maintained in said predetermined frequency range.

16. A process in accordance with claim 15, wherein:

a signal, which is proportional to the laser output, is additionally sent to the microprocessor at another analog input, the microprocessor forms the quotient of the filter signal and the output signal or its reciprocal value and determines the minimum of this quotient of the filter signal and output signal or the maximum of the reciprocal values thereof numerically by means of a algorithm as a function of the temperature, and adjusts the temperature via a control output such that this minimum of the relative noise will be maintained in the said predetermined frequency range.

17. A process in accordance with claim 1, wherein:

said filter signal is one of rectified or squared and/or integrated and a quotient of this filter signal and a signal proportional to the laser output or a reciprocal value thereof is likewise formed analogously, and that the output signal of the quotient former is then sent to an analog input of a microprocessor, which determines the minimum of the quotient of the noise and output or the maximum of the reciprocal values thereof numerically by means of a algorithm as a function of the temperature and adjusts the temperature via a control output such that this minimum of the noise will be maintained in said predetermined frequency range.

18. A process in accordance with claim 1, wherein:

said adjusting of said temperature includes sending a temperature control signal is to a temperature control unit of the frequency doubler crystal or is added to a set point of a temperature control unit of the frequency doubler crystal.

* * * * *